United States Patent [19]
Perz et al.

[11] Patent Number: 5,958,124
[45] Date of Patent: Sep. 28, 1999

[54] ROTOGRAVURE OR FLEXOGRAPHIC PRINTING INK COMPOSITION CONTAINING AN ANTIWEAR AGENT

[75] Inventors: John S. Perz, Mentor; Steven L. Rotz, Solon, both of Ohio

[73] Assignee: The Lubrizol Corporation, Wickliffe, Ohio

[21] Appl. No.: 09/060,476

[22] Filed: Apr. 15, 1998

[51] Int. Cl.[6] .................................................. C09D 11/02
[52] U.S. Cl. .................... 106/31.86; 106/31.6; 106/31.9
[58] Field of Search ............................... 106/31.86, 31.6, 106/31.9

[56] References Cited

U.S. PATENT DOCUMENTS

| | | | |
|---|---|---|---|
| 4,308,154 | 12/1981 | Clason et al. | 252/35 |
| 4,352,899 | 10/1982 | Tada et al. | 523/451 |
| 4,417,990 | 11/1983 | Clason et al. | 252/35 |
| 5,037,564 | 8/1991 | Nishizaki et al. | 252/22 |
| 5,173,111 | 12/1992 | Krishnan et al. | 106/31.86 |
| 5,522,920 | 6/1996 | Kawasumi et al. | 106/31.86 |

FOREIGN PATENT DOCUMENTS 60-238375  11/1985  Japan .

Primary Examiner—Helene Klemanski
Attorney, Agent, or Firm—James L. Cordek; Joseph P. Fischer

[57] ABSTRACT

Disclosed is a rotogravure or flexographic printing ink composition, comprising (A) an ink comprising a pigment dispersed in a fluid vehicle, said vehicle comprising resin incorporated into an aqueous or non-aqueous solvent or a mixture of such solvents; and (B) a wear reducing amount of a metal dihydrocarbyl dithiophosphate of the formula

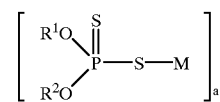

wherein $R^1$ and $R^2$ are each independently hydrocarbyl groups containing from 3 to about 30 carbon atoms, M is a metal and a is an integer equal to the valence of M.

20 Claims, No Drawings

ROTOGRAVURE OR FLEXOGRAPHIC PRINTING INK COMPOSITION CONTAINING AN ANTIWEAR AGENT

FIELD OF THE INVENTION

The present invention relates to a printing ink composition that contains an antiwear agent. The antiwear agent reduces the wear on wiping blades and, in particular on doctor blades that are used for wiping cylinders and rollers in various printing processes. The antiwear agent also reduces wear on gravure cylinder and anilox rollers.

BACKGROUND OF THE INVENTION

Printing inks and printing methods may be broadly divided into four major classes which vary considerably in ink compositions, method of applications and drying mechanisms. Typographic printing is a method of printing from raised characters or plates which are first inked and then pressed against the surface to be printed, thus transferring the ink. The ink must have sufficient viscosity (tack) and adhesion so that it can be evenly distributed on the rollers of the press and be transferred properly from the type on printing plates to the paper or other substrate being printed.

The second major method of printing is lithography which is also known as planographic printing since the process prints from plane surfaces and depends on the fact that grease and water are mutually repellent. If a design is drawn with a greasy substance on a finely-grained metal surface which retains moisture, the lithographic ink will adhere to the design and not the remainder of the plate. In the form of offset lithography, the greasy image is formed on a thin grained metal plate by photographic means and the metal plate is curved and clamped around the plate cylinder of an offset press. Lithographic or offset inks are more viscous than typographic inks and must be substantially resistant to emulsification due to the high speeds developed by offset presses, the presence of water and the resulting high rates of shear. Additionally, the presence of large amounts of volatile solvents in the ink vehicle is undesirable since the solvent will tend to dissolve away the greasy image and cause the plate to go blind. Evaporation of the solvent further gives rise to increased viscosity of the ink which, in time, affects the fidelity of printing.

The present invention is concerned with the third and fourth major methods of printing, i.e., gravure printing and flexographic printing. Photogravure, rotogravure or gravure printing (the three terms will be used interchangeably) is a generally-known printing technique whereby intaglio engravings of an image to be printed on a substrate (usually paper) are formed on the surface of a grooved cylinder. Intaglio engravings are those where the elements to be printed are formed below the surface of the gravure cylinder, typically by engraving into a metallic cylinder, thereby forming ink-retaining grooves or cells in the cylinder. Used in conjunction with the etched or engraved gravure cylinder is the very important doctor blade which controls the amount of ink transferred from the printing surface of the cylinder to the paper or other substrate material.

In rotogravure intaglio inks which are used to print at high speeds from chemically or electronically engraved copper or chromium-faced cylinders or anilox rolls, the wiping of the cylinders or rollers is achieved mechanically by means of a doctor blade. A doctor blade is usually a long, thin resilient strip of metal that is mounted in the printing machine parallel to the axis of rotation of the gravure cylinder or anilox rollers, and the edge of the doctor blade comes in contact with the surface of the cylinder or the anilox rollers. When the machine is in operation, the doctor blade controls the amount of ink transferred to the substrate by wiping the excess ink from the surface of the cylinder or anilox rollers, thereby leaving only the ink within the etching or engravings for transfer.

While proper etching or engraving of the cylinder or anilox rollers is extremely important to the quality of the ultimate printed product, the significance of the doctor blade cannot be discredited. Indeed, even if the cylinder or anilox roller has been properly engraved, excessive or uneven doctor blade wear and improper usage will prevent the obtaining of a proper printed image.

By and large, doctor blade assemblies are a two-part configuration of a back-up blade and a doctor blade. Both the back-up blade and the doctor blade are held in a blade holder so that the doctor blade is urged against the cylinder. Even though the doctor blade will wear as a result of the wiping action against the cylinder and must eventually be replaced, the back-up blade is usually reusable. The back-up blade adds support to the very thin doctor blade and securely holds the thin doctor blade in the block holder.

In flexographic printing, also known as relief printing, ink is transferred from a pool of ink to a substrate by way of a printing plate. The surface of the plate is shaped so that the image to be printed appears in relief, in the same way that rubber stamps are cut so as to have the printed image appear in relief on the surface of the rubber. Typically, the plate is mounted on a cylinder, and the cylinder rotates at high speed such that the raised surface of the printing plate contacts a pool of ink, is slightly wetted by the ink, then exits the ink pool and contacts a substrate web, thereby transferring ink from the raised surface of the plate to the substrate to form a printed substrate.

Japanese Laid-Open Patent Publication No. 60-238,375 (Honda et al., Publication Date Nov. 27, 1985) relates to a water-based ink composition for ball point pens, comprising as essential components a dithiophosphate represented by the following general formula, a coloring agent and water:

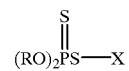

wherein R is a hydrogen atom, a lower alkyl group or an alicyclic hydrocarbon group; X is an alkali metal atom, an alkaline earth metal atom, ammonia, an N-substituted ammonium or piperidinium.

SUMMARY OF THE INVENTION

A rotogravure or flexographic printing ink composition is disclosed which comprises (A) an ink comprising a pigment dispersed in a fluid vehicle, said vehicle comprising resin incorporated into an aqueous or non-aqueous solvent or a mixture of such solvents; and (B) a wear reducing amount of a metal dihydrocarbyl dithiophosphate of the formula

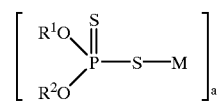

wherein $R^1$ and $R^2$ are each independently hydrocarbyl groups containing from 3 to about 30 carbon atoms, M is a metal and a is an integer equal to the valence of M.

DETAILED DESCRIPTION OF THE INVENTION

As used in this specification and appended claims, the terms "hydrocarbyl" or hydrocarbon-based" denote a group having a carbon atom directly attached to the remainder of the molecule and having predominantly hydrocarbon character within the context of this invention. Such groups include the following:

(1) Hydrocarbon groups; that is, aliphatic (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, phenyl, etc.

(2) Substituted hydrocarbon groups, that is, groups containing non-hydrocarbon substituents which, in the context of this invention, do not alter the predominantly hydrocarbon character of the group. Those skilled in the art will be aware of suitable substituents. Examples include halo, hydroxy, nitro, cyano, alkoxy, acyl, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl-based group", "aryl-based group" and the like have meaning analogous to the above with respect to alkyl and aryl groups and the like.

(A) The Printing Ink

The printing ink comprises a pigment dispersed in a fluid vehicle wherein the vehicle comprises resin incorporated into an aqueous or non-aqueous solvent or a mixture of such solvents. Apart from the present invention, the printing ink components are conventional in nature. Typical solvents comprise aliphatic hydrocarbons, naphthenic hydrocarbons, aromatic hydrocarbons (e.g., toluene, xylene), alcohols of 1 to 4 carbon atoms, glycols of 2 to 12 carbon atoms, glycol ethers, ketones or esters as well as water or a water miscible cosolvent. Examples of water miscible cosolvents are the glycol ethers.

The pigment is conventional in nature and may be any organic pigment used in printing inks or may be inorganic in nature. Monoarylide yellows, diarylide yellows, pyrazolones, bezimidazolones, toluidine red, naphthol red, lithlol rubines, and phthalocyanine blue and green are examples of organic pigments. Illustrative of inorganic pigments are carbon black, titanium dioxide, zinc sulfide, calcium carbonate, and China clay.

The printing ink will also contain binders such as resins. The selection of resins for rotogravure inks depends on the solvent and the substrate to be printed and the end use of the printed matter. Detailed examples of over 300 resins used in the manufacture of inks, including gravure types, are set forth in "Synthetic Resins" by Wemer Husen, The American Ink Maker, June 1952, page 63. Useful resins include rosin and modified rosins, such as calcium and zinc resinates and variants of these. See also "Synthetic Resins for Inks," John P. Petrone, The American Ink Maker, Vol. 49, March–October 1971. Both of these articles are incorporated herein by reference.

Other resins other than those mentioned above which can be employed are petroleum resins or various modified products of cyclopentadiene resins, examples of which are found in U.S. Pat. No. 3,084,147 and British Pat. No. 1,369,370. These disclosures are also incorporated by reference. Still another modified resin suitable for use in gravure inks is the resin which is prepared by collecting a fraction boiling at 140°–220° C. from a cracking oil which is obtained by thermal cracking of petroleum, polymerizing the fraction using a Friedel-Crafts catalyst to give a resin having a softening point of 160° C., reacting the resin with an unsaturated carboxylic acid or its anhydride in an amount of 0–4 moles per 100 gram of the resin, and then esterifying the resulting resin using a monovalent alcohol in an amount of 0–2 moles per mole of the above unsaturated carboxylic acid or anhydride, to give a resin having a softening point of 145° C. The product has a stable viscosity and induces excellent printing. See Japanese Pat. No. 47,994/72.

The resin employed in the gravure ink is used in a vehicle whose solvent constituent may be an aliphatic or an alicyclic hydrocarbon such as hexane, heptane, and cyclohexane. The resin also may be used in aromatic hydrocarbon solvents such as xylene, toluene and high flash naphtha. The resin must be soluble in the solvent and readily separated therefrom. Since the drying of gravure ink results from evaporation of the solvent, the ink vehicle is basically a resin and solvent. Depending upon the particular combination of resin and solvent, various types of vehicles can be used.

Color reproduction by the gravure process requires that the colored inks be printed on the paper at least twice and most often four times. Although a wide range of hues may be produced with two colors, a more complete range is achieved with the three basic colors derived from pigments generically referred to as yellow, magenta and cyan, but black is often added as well. Thus, the yellow is usually printed first and dried, and the red is printed after the yellow. After the cyan is printed, the cylinder is set up to print black as the fourth color to allow the printer better control of the hues in the reproduction at the time of printing. Thus, four color printing is very commonly used for quality work, but often additional specified colors may be used or the type may be printed separately. In skilled hands, these techniques are capable of yielding excellent color reproductions.

The gravure color process, because it requires overprinting one color by another at least once and often four times or more, makes particular demands on the cleanliness of the ink. The occurrence of streaking in any one of the inks, particularly black, cyan or magenta, materially degrades a high quality reproduction and makes it unacceptable. The usual remedies, such as filtering, often correct this problem.

(B) The Metal Dihydrocarbyl Dithiophosphate

The ink compositions of this invention includes a wear reducing amount of a metal dihydrocarbyl dithiophosplhate of the formula

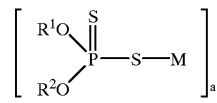

wherein $R^1$ and $R^2$ are each independently hydrocarbyl groups containing from 3 to about 30 carbon atoms, M is a metal and a is an integer equal to the valence of M. The hydrocarbyl groups $R^1$ and $R^2$ may be alkyl, cycloalkyl, aralkyl or alkaryl groups, or a substantially hydrocarbon group of similar structure. By "substantially hydrocarbon" is meant hydrocarbons which contain substituent group such as ether, ester, nitro or halogen which do not materially affect the hydrocarbon character of the group. Preferably, the hydrocarbyl groups are alkyl groups and most preferably are alkyl groups that contain up to 13 carbon atoms.

Illustrative alkyl groups include isopropyl, isobutyl, n-butyl, sec-butyl, the various amyl groups, n-hexyl, methylisobutyl, heptyl, 2-ethylhexyl, diisobutyl, isooctyl, nonyl, behenyl, decyl, dodecyl, tridecyl, etc. Illustrative lower alkyl phenyl groups include butylphenyl, amylphenyl, heptylphenyl, etc. Cycloalkyl groups likewise are useful and these include the lower alkyl-substituted cyclohexyl groups.

The metal M of the metal dihydrocarbyl dithiophosphate comprises Group I metals, Group II metals, aluminum, lead, tin, manganese, cobalt, nickel, zinc or copper. In some embodiments, zinc and copper are especially useful metals. Examples of useful metals of dihydrocarbyl dithiophosphoric acids and methods for preparing such salts are found in the prior art such as U.S. Pat. Nos. 4,938,881; 4,263,150; 4,289,635; 4,308,154; 4,322,479; 4,417,990; and 4,666,895, and the disclosures of these patents are hereby incorporated by reference.

The dihydrocarbyl dithiophosphate metal salts are prepared from dithiophosphoric acids which, in turn, are prepared by reacting about 4 moles of an alcohol or mixture of alcohols with 1 mole of phosphorus pentasulfide. The reaction of the alcohol or alcohol mixture is carried out within a temperature range of from about 50° to about 200° C. The reaction is generally completed in about 1 to 10 hours, and hydrogen sulfide is liberated during the reaction.

The dithiophosphoric acids are prepared from alcohols that contain from 3 to 30 carbon atoms and preferably from 3 to 13 carbon atoms. These alcohols are (a) a single alcohol which may be either a primary or secondary alcohol, (b) mixtures of primary alcohols, (c) mixtures of isopropyl alcohol and secondary alcohols, (d) mixtures of isopropyl alcohol, secondary alcohols and primary alcohols, (e) mixtures of primary alcohols and secondary alcohols other than isopropyl alcohol, or (f) mixtures of secondary alcohols. In the instances above where isopropyl alcohol is present in the mixture, i.e., (c) and (d), the alcohol mixture will contain at least 10 mole percent of isopropyl alcohol and will generally comprise from about 20 mole percent to about 90 mole percent of isopropyl alcohol. In another embodiment, the alcohol mixture will comprise from about 40 to about 60 mole percent of isopropyl alcohol, the remainder being one or more primary aliphatic alcohols.

The primary alcohols which may be used singly or included in the alcohol mixture include n-butyl alcohol, isobutyl alcohol, n-amyl alcohol, isoamyl alcohol, n-hexyl alcohol, 2-ethyl-1-hexyl alcohol, isooctyl alcohol, nonyl alcohol, decyl alcohol, dodecyl alcohol, tridecyl alcohol, etc. The primaly alcohols also may contain various substituent groups such as halogens. Particular examples of useful mixtures of alcohols include, for example, isopropyl/n-butyl; isopropyl/secondary butyl; isopropyl/2-ethyl-1-hexyl; isopropyl/isooctyl; isopropyl/decyl; isopropyl/dodecyl; and isopropyl/tridecyl. In one preferred embodiment, the primary alcohols contain from 6 to 13 carbon atoms and the total number of carbon atoms per phosphorus atom is at least 9.

The composition of the phosphorodithioic acid obtained by the reaction of a mixture of alcohols (e.g., isopropyl alcohol and 4-methyl-2-penltanol) with phosphorus pentasulfide is actually a statistical mixture of three phosphorodithioic acids as illustrated by the following formulae:

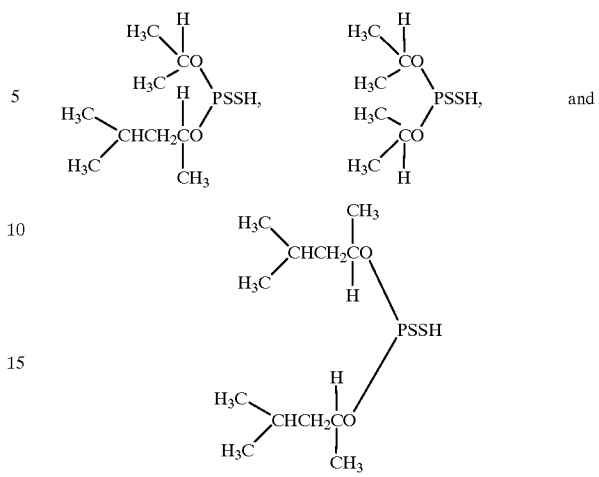

The preparation of the metal salt of the dithiophosphoric acids may be effected by reaction with the metal or metal oxide. Simply mixing and heating, these two reactants is sufficient to cause the reactions to take place and the resulting product is sufficiently pure for the purpose of this invention. Typically, the formation of the salt is carried out in the presence of a diluent such as an alcohol, water or diluent oil. Neutral salts are prepared by reacting one equivalent of metal oxide or hydroxide with one equivalent of the acid. Basic metal salts are prepared by adding an excess of (more than one equivalent) of the metal oxide or hydroxide with one equivalent of phosphorodithioic acid.

The following examples illustrate the preparation of the metal salts of dithiophosphoric acid prepared from alcohols or mixtures of alcohols. In the following examples as well as throughout the specification and in the claims, unless otherwise indicated, all parts and percentages are by weight, all temperatures are in degrees Celsius and all pressures are atmospheric.

EXAMPLE B-1

A phosphorodithioic acid is prepared by reacting finely powdered phosphorus pentasulfide with an alcohol mixture containing 11.53 moles (692 parts by weight) of isopropyl alcohol and 7.69 moles (1000 parts by weight) of isooctanol. The phosphorodithioic acid obtained in this manner has an acid number of about 178–186 and contains 10.0% phosphorus and 21.0% sulfur. This phosphorodithioic acid is then reacted with an oil slurry of zinc oxide. The quantity of zinc oxide included in the oil slurry is 1.10 times the theoretical equivalent of the acid number of the phosphorodithioic acid. The oil solution of the zinc salt prepared in this manner contains 12% oil, 8.6% phosphorus, 18.5% sulfur and 9.5% zinc.

EXAMPLE B-2

(a) A phosphorodithioic acid is prepared by reacting a mixture of 1560 parts (12 moles) of isooctyl alcohol and 180 parts (3 moles) of isopropyl alcohol with 756 parts (3.4 moles) of phosphorus pentasulfide. The reaction is conducted by heating the alcohol mixture to about 55° C. and thereafter adding the phosphorus pentasulfide over a period of 1.5 hours while maintaining the reaction temperature at about 60°–75° C. After all of the phosphorus pentasulfide is added, the mixture is heated and stirred for an additional hour at 70°–75° C., and thereafter filtered through a filter aid.

(b) Zinc oxide (282 parts, 6.87 moles) is charged to a reactor with 278 parts of mineral oil. The phosphorodithioic acid prepared in (a) (2305 parts, 6.28 moles) is charged to the zinc oxide slurry over a period of 30 minutes with an exotherm to 60° C. The mixture then is heated to 80° C. and maintained at this temperature for 3 hours. After stripping to 100° C. and 6 mm. mercury, the mixture is filtered twice through a filter aid, and the filtrate is the desired oil solution of the zinc salt containing 10% oil, 7.97% zinc (theory 7.40); 7.21% phosphorus (theory 7.06); and 15.64% sulfur (theory 14.57).

EXAMPLE B-3

(a) Isopropyl alcohol (396 parts, 6.6 moles) and 1287 parts (9.9 moles) of isooctyl alcohol are charged to a reactor and heated with stirring to 59° C. Phosphorus pentasulfide (833 parts, 3.75 moles) is then added under a nitrogen sweep. The addition of the phosphorus pentasulfide is completed in about 2 hours at a reaction temperature between 59°–63° C. The mixture then is stirred at 45°–63° C. for about 1.45 hours and filtered. The filtrate is the desired phosphorodithioic acid.

(b) A reactor is charged with 312 parts (7.7 equivalents) of zinc oxide and 580 palts of mineral oil. While stirring at room temperature, the phosphorodithioic acid prepared in (a) (2287 parts, 6.97 equivalents) is added over a period of about 1.26 hours with an exotherm to 54° C. The mixture is heated to 78° C. and maintained at 78°–85° C. for 3 hours. The reaction mixture is vacuum stripped to 100° C. at 19 mm. mercury. The residue is filtered through a filter aid, and the filtrate is an oil solution (19.2% oil) of the desired zinc salt containing 7.86% zinc, 7.76% phosphorus and 14.8% sulfur.

EXAMPLE B-4

The general procedure of Example B-3 is repeated except that the mole ratio of isopropyl alcohol to isooctyl alcohol is 1:1. The product obtained in this manner is an oil solution (10% oil) of the zinc phosphorodithioate containing 8.96% zinc, 8.49% phosphorus and 18.05% sulfur.

EXAMPLE B-5

A phosphorodithioic acid is prepared in accordance with the general procedure of Example B-3 utilizing an alcohol mixture containing 520 parts (4 moles) of isooctyl alcohol and 360 parts (6 moles) of isopropyl alcohol with 504 parts (2.27 moles) of phosphorus pentasulfide. The zinc salt is prepared by reacting an oil slurry of 116.3 parts of mineral oil and 141.5 parts (3.44 moles) of zinc oxide with 950.8 parts (3.20 moles) of the above-prepared phosphorodithioic acid. The product prepared in this manner is an oil solution (10% mineral oil) of the desired zinc salt, and the oil solution contains 9.36% zinc, 8.81% phosphorus and 18.65% sulfur.

EXAMPLE B-6

(a) A mixture of 520 parts (4 moles) of isooctyl alcohol and 559.8 parts (9.33 moles) of isopropyl alcohol is prepared and heated to 60° C. at which time 672.5 parts (3.03 moles) of phosphorus pentasulfide are added in portions while stirring. The reaction then is maintained at 60°–65° C. for about one hour and filtered. The filtrate is the desired phosphorodithioic acid.

(b) An oil slurry of 188.6 parts (4 moles) of zinc oxide and 144.2 parts of mineral oil is prepared, and 1145 parts of the phosphorodithioic acid prepared in (a) are added in portions while maintaining the mixture at about 70° C. After all of the acid is charged, the mixture is heated at 80° C. for 3 hours. The reaction mixture then is stripped of water to 110° C. The residue is filtered through a filter aid, and the filtrate is an oil solution (10% mineral oil) of the desired product containing 9.99% zinc, 19.55% sulfur and 9.33% phosphorus.

EXAMPLE B-7

A phosphorodithioic acid is prepared by the general procedure of Example B-3 utilizing 260 parts (2 moles) of isooctyl alcohol, 480 parts (8 moles) of isopropyl alcohol, and 504 parts (2.27 moles) of phosphorus pentasulfide. The phosphorodithioic acid (1094 parts, 3.84 moles) is added to an oil slurry containing 181 parts (4.41 moles) of zinc oxide and 135 parts of mineral oil over a period of 30 minutes. The mixture is heated to 80° C. and maintained at this temperature for 3 hours. After stripping to 100° C. and 19 mm. mercury, the mixture is filtered twice through a filter aid, and the filtrate is an oil solution (10% mineral oil) of the zinc salt containing 10.06% zinc, 9.04% phosphorus, and 19.2% sulfur.

EXAMPLE B-8

(a) A mixture of 259 parts (3.5 moles) of normal butyl alcohol and 90 parts (1.5 moles) of isopropyl alcohol is heated to 40° C. under a nitrogen atmosphere whereupon 244.2 parts (1.1 moles) of phosphorus pentasulfide are added in portions over a period of one hour while maintaining the temperature of the mixture of between about 55°–75° C. The mixture is maintained at this temperature for an additional 1.5 hours upon completion of the addition of the phosphorus pentasulfide and then cooled to room temperature. The reaction mixture is filtered through a filter aid, and the filtrate is the desired phosphorodithioic acid.

(b) Zinc oxide (67.7 parts, 1.65 equivalents) and 51 parts of mineral oil are charged to a 1-liter flask and 410.1 parts (1.5 equivalents) of the phosphorodithioic acid prepared in (a) are added over a period of one hour while raising the temperature gradually to about 67° C. Upon completion of the addition of the acid, the reaction mixture is heated to 74° C. and maintained at this temperature for about 2.75 hours. The mixture is cooled to 50° C. and a vacuum is applied while raising the temperature to about 82° C. The residue is filtered, and the filtrate is the desired product. The product is a clear, yellow liquid containing 21.0% sulfur (19.81 theory), 10.71% zinc (10.05 theory), and 10.17% phosphorus (9.59 theory).

EXAMPLE B-9

(a) A mixture of 240 (4 moles) parts of isopropyl alcohol and 444 parts of n-butyl alcohol (6 moles) is prepared under a nitrogen atmosphere and heated to 50° C. whereupon 504 parts of phosphorus pentasulfide (2.27 moles) are added over a period of 1.5 hours. The reaction is exothermic to about 68° C., and the mixture is maintained at this temperature for an additional hour after all of the phosphorus pentasulfide is added. The mixture is filtered through a filter aid, and the filtrate is the desired phosphorodithioic acid.

(b) A mixture of 162 parts (4 equivalents) of zinc oxide and 113 parts of a mineral oil is prepared, and 917 parts (3.3 equivalents) of the phosphorodithioic acid prepared in (a) are added over a period of 1.25 hours. The reaction is exothermic to 70° C. After completion of the addition of the acid, the mixture is heated for three hours at 80° C., and stripped to 100° C. at 35 mm. mercury. The mixture then is the desired product. The product is a clear, yellow liquid containing 10.75% zinc (9.77 theory), 10.4% phosphorus and 21.35% sulfur.

EXAMPLE B-10

(a) A mixture of 420 parts (7 moles) of isopropyl alcohol and 518 parts (7 moles) of n-butyl alcohol is prepared and heated to 60° C. under a nitrogen atmosphere. Phosphorus pentasulfide (647 parts, 2.91 moles) is added over a period of one hour while maintaining the temperature at 675°–77° C. The mixture is stirred an additional hour while cooling. The material is filtered through a filter aid, and the filtrate is the desired phosphorodithioic acid.

(b) A mixture of 113 parts (2.76 equivalents) of zinc oxide and 82 parts of mineral oil is prepared and 662 parts of the phosphorodithioic acid prepared in (a) are added over a period of 20 minutes. The reaction is exothermic and the temperature of the mixture reaches 70° C. The mixture then is heated to 90° C. and maintained at this temperature for 3 hours. The reaction mixture is stripped to 105° C. and 20 mm. mercury. The residue is filtered through a filter aid, and the filtrate is the desired product containing 10.17% phosphorus, 21.0% sulfur and 10.98% zinc.

EXAMPLE B-11

A mixture of 69 parts (0.97 equivalent of cuprous oxide and 38 parts of mineral oil is prepared and 239 parts (0.88 equivalent) of the phosphorodithioic acid prepared in Example B-10(a) are added over a period of about 2 hours. The reaction is slightly exothermic during the addition, the mixture is thereafter stirred for an additional 3 hours while maintaining the temperature at about 70° C. The mixture is stripped to 105° C. and 10 mm. mercury and filtered. The filtrate is a dark-green liquid containing 17.3% copper.

EXAMPLE B-12

A mixture of 29.3 parts (1.1 equivalents) of ferric oxide and 3 parts of mineral oil is prepared, and 273 parts (1.0 equivalent) of the phosphorodithioic acid prepared in Example B-10(a) are added over a period of 2 hours. The reaction is exothermic during the addition, and the mixture is thereafter stirred an additional 3.5 hours while maintaining the mixture at 70° C. The product is stripped to 105° C. and 10 mm. mercury and filtered through a filter aid. The filtrate is a black-green liquid containing 4.9% iron and 10.0% phosphorus.

EXAMPLE B-13

A mixture of 239 parts (0.41 mole) of the product of Example B-10(a), 11 parts (0.15 mole) of calcium hydroxide and 10 parts of water is heated to about 80° C. and maintained at this temperature for 6 hours. The product is stripped to 105° C. and 10 mm. mercury and filtered through a filter aid. The filtrate is a molasses-colored liquid containing 2.19% calcium.

EXAMPLE B-14

The procedure of Example B-1 is repeated except that the zinc oxide is replaced by an equivalent amount of cuprous oxide.

EXAMPLE B-15

(a) A mixture of 105.6 parts (1.76 moles) of isopropyl alcohol and 269.3 parts 2.64 moles) of 4-methyl-2-pentanol is prepared and heated to 70° C. Phosphorus pentasulfide (222 parts, 1 mole) is added to the alcohol mixture while maintaining the temperature at 70° C. One mole of hydrogen sulfide is liberated. The mixture is maintained at 70° C. for an additional four hours. The mixture is filtered through diatomaceous earth to yield a green liquid product having an acid number in the range of 179–189.

(b) Zinc oxide (44.6 parts, 1.09 equivalents) is added to diluent oil to form a slurry. One equivalent (based upon the measured acid number) of the phosphorodithioic acid prepared in (a) are added dropwise to the zinc oxide slurry. The reaction is exothermic. The reaction mixture is stripped to 100° C. and 20 mm. mercury to remove water of reaction and excess alcohol. The residue is filtered through diatomaceous earth. The filtrate, which is a viscous liquid, is diluted with diluent oil to provide a final product having a 9.5% by weight phosphorus content.

EXAMPLE B-16

(a) A mixture of 317.33 parts (5.28 moles) of 2-propanol and 359.67 parts (3.52 moles) of 4-methyl-2-pentanol is prepared and heated to 60° C. Phosphorus pentasulfide (444.54 parts, 2.0 moles) is added to the alcohol mixture while maintaining the temperature at 60° C. Two moles of hydrogen sulfide are liberated and trapped with a 50% aqueous sodium hydroxide trap. The mixture is heated to and maintained at 70° C. for two hours. The mixture is cooled to room temperature and filtered through diatomaccous earth to yield a liquid green product having an acid number in the range of 193–203.

(b) Zinc oxide (89.1 parts, 1.1 moles) is added to 200 ml of toluene. The phosphorodithioic acid prepared in (a) (566.6 parts, 2.0 equivalents based on acid number) are added dropwise to the zinc oxide/toluene mixture. The resulting reaction is exothermic. The reaction mixture is stripped to 70° C. and 20 mm. mercury to remove water of reaction, toluene and excess alcohol. The residue is filtered through diatomaceous earth. The filtrate, which is the desired product, is a yellow viscous liquid.

EXAMPLE B-17

(a) A mixture of 238 parts (4.0 moles) of isopropyl alcohol and 269.3 parts (2.64 moles) of 4-methyl-2-pentanol is heated to 50° C. with stirring. Added at this temperature is 333 parts (3.0 moles) of phosphorus pentasulfide in portions over a two-hour period while maintaining the temperature at about 50° C. The mixture is maintained at this temperature for an additional one hour after the addition of the phosphorus pentasulfide. The contents are cooled to room temperature and filtered through a filter aid to give the desired phosphorodithioic acid.

(b) Zinc oxide (79.7 parts, 1.95 equivalents) and 57.2 parts of mineral oil are added to a 1-liter flask and 515 parts (1.79 equivalents) of the phosphorodithioic acid prepared in (a) is added over a period of one hour. The maximum temperature during the acid addition is 53° C. After addition of the acid, the temperature is raised to 75–80° C. and held for 3.0 hours. The contents are then vacuum stripped to 102° C. and 30 millimeters of mercury. The contents are filtered using a filter aid to give a product having 11.05% zinc, 21.0% sulfur and 10.0% phosphorus.

EXAMPLE B-18

(a) Added to a three liter, four necked flask is 1500 parts (14.7 moles) of 4-methyl-2-pentanol. The alcohol is heated to 60° C. and 741 parts (3.34 moles) of phosphorus pentasulfide is added over an 8-hour period while maintaining the temperature between 55–65° C. The contents are cooled to room temperature and filtered through a filter aid to give the desired phosphorodithioic acid.

(b) Added to a five liter, four necked flask is 75 parts oil and 189 parts (4.61 equivalents) zinc oxide. At room temperature 1372 parts (4.0 equivalents) of the phosphorodithioic acid prepared in (a) is added over a 30 minute period. The addition causes an exotherm to 57° C. After the addition is complete, the temperature is increased to 65°. and held for 2 hours. The contents are stripped under vacuum to 120° C. and 15 millimeters of mercury. The contents are filtered using a filter and to give a product having 9.25% zinc, 17.6% sulfur and 8.5% phosphorus.

The rotogravure or flexographic printing ink composition of this invention reduces wear on various components within a printing press. The parts that show reduced wear when this composition is used are the doctor blades, the gravure cylinder and the anilox rollers. In utilizing the wear reducing component (B) in an ink (A), the weight ratio of A:B is from 90:10 to 99.9:0.1, preferably the weight ratio of A:B is 95:5 to 99.8:0.2 and most preferably the weight ratio of A:B is from 97.5:2.5 to 99.7:0.3.

In Table I, a comparison is shown between Magee 470, an oil used in printing ink formulations, acting as component (A) alone versus a blend of this oil and component (B) in the Shell 4-Ball Wear Test.

TABLE I

| Example | (A) | (B) | 4 Ball Wear Avg. Sear Diam/Avg. Coeff. of Friction |
|---|---|---|---|
| 1 | 100 parts oil | None | 1.11/0.142 |
| 2 | 99.7 parts oil | 0.3 parts Example B-15 | 0.90/0.107 |
| 3 | 99 parts oil | 1 part Example B-15 | 0.96/0.172 |
| 4 | 98 parts oil | 2 parts Example B-15 | 0.87/0.129 |
| 5 | 99.7 parts oil | 0.3 parts Example B-17 | 1.05/0.147 |
| 6 | 99 parts oil | 1 part Example B-17 | 0.75/0.146 |
| 7 | 98 parts oil | 2 parts Example B-17 | 0.93/0.135 |
| 8 | 99.7 parts oil | 0.3 parts Example B-18 | 0.96/0.125 |
| 9 | 99 parts oil | 1 part Example B-18 | 0.90/0.09 |
| 10 | 98 parts oil | 2 parts Example B-18 | 0.93/0.173 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A rotogravure or flexographic printing ink composition, comprising (A) an ink comprising a pigment dispersed in a fluid vehicle, said vehicle comprising resin incorporated into an aqueous or non-aqueous solvent or a mixture of such solvents; and (B) a wear reducing amount of a metal dihydrocarbyl dithiophosphate of the formula

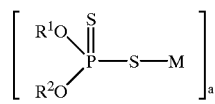

wherein $R^1$ and $R^2$ are each independently hydrocarbyl groups containing from 3 to about 30 carbon atoms, M is a metal and a is an integer equal to the valence of M.

2. The composition of claim 1 wherein the pigment is an organic pigment or an inorganic pigment.

3. The composition of claim 2 wherein the organic pigment comprises monoarylide yellows, diarylide yellows, pyrazolones, benzimidazolones, toluidine red, naphthol red, lithol rubines, phthalocyanine blue or phthalocyanine green.

4. The composition of claim 2 wherein the inorganic pigment comprises carbon black, titanium dioxide, zinc sulfide, calcium carbonate or China clay.

5. The composition of claim 1 wherein the color derived from the pigment is cyan.

6. The composition of claim 1 wherein the color derived from the pigment is magenta.

7. The composition of claim 1 wherein the color derived from the pigment is yellow.

8. The composition of claim 1 wherein the color derived from the pigment is black.

9. The composition of claim 1 wherein the solvent is water or a water miscible cosolvent.

10. The composition of claim 1 wherein the solvent comprises aliphatic hydrocarbons, naphthenic hydrocarbons, aromatic hydrocarbons, alcohols of 1 to 4 carbon atoms, glycols of 2 to 12 carbon atoms, glycol ethers, ketones or esters.

11. The composition of claim 1 wherein the hydrocarbyl groups comprise alkyl, cycloalkyl, aralkyl, or alkaryl groups.

12. The composition of claim 1 wherein the hydrocarbyl groups are alkyl groups that contain up to 13 carbon atoms.

13. The composition of claim 1 wherein the metal M comprises aluminum, lead, tin, manganese, cobalt, nickel, zinc or copper.

14. The composition of claim 1 wherein the metal M comprises zinc or copper.

15. The composition of claim 1 wherein the weight ratio of A:B is 90:10 to 99.9:0.1.

16. The composition of claim 1 wherein the weight ratio of A:B is 95:5 to 99.8:0.2.

17. The composition of claim 1 wherein the weight ratio of A:B is 97.5:2.5 to 99.7:0.3.

18. The composition of claim 1 wherein the metal is zinc and the phosphorus acid is prepared by reacting phosphorus pentasulfide with a secondary alcohol.

19. The composition of claim 1 wherein the metal is zinc and the phosphorus acid is prepared by reacting phosphorus pentasulfide with a mixture of secondary alcohols wherein isopropyl alcohol is one of the secondary alcohols and is present at a level of at least 10 mole percent.

20. The composition of claim 1 wherein the metal is zinc and the phosphorus acid is prepared by reacting phosphorus pentasulfide with a mixture of at least one secondary alcohol and one primary alcohol wherein the at least one secondary alcohol is isopropyl alcohol.

* * * * *